United States Patent [19]

Fortune

[11] 4,030,361

[45] June 21, 1977

[54] FLOATING BATH WATER TEMPERATURE MEASURING INSTRUMENT

[76] Inventor: Jeffrey L. Fortune, 3901 40th St. South, St. Petersburg, Fla. 33711

[22] Filed: Dec. 22, 1975

[21] Appl. No.: 643,535

[52] U.S. Cl. .................................. 73/353; 73/431
[51] Int. Cl.² ........................................ G01K 1/08
[58] Field of Search ............... 73/353, 431, 343 R; 116/114.5, 114 Y

[56] References Cited

UNITED STATES PATENTS 2,019,221  10/1935  Hastings ............................. 73/353

FOREIGN PATENTS OR APPLICATIONS 834,349  11/1938  France ................................ 73/353

Primary Examiner—S. Clement Swisher
Assistant Examiner—Denis E. Corr

[57] ABSTRACT

A floating temperature measuring instrument for measuring water temperature of a personal bath. Measuring bath water temperature improves ones ability to draw a safe and comfortable bath.

5 Claims, 3 Drawing Figures

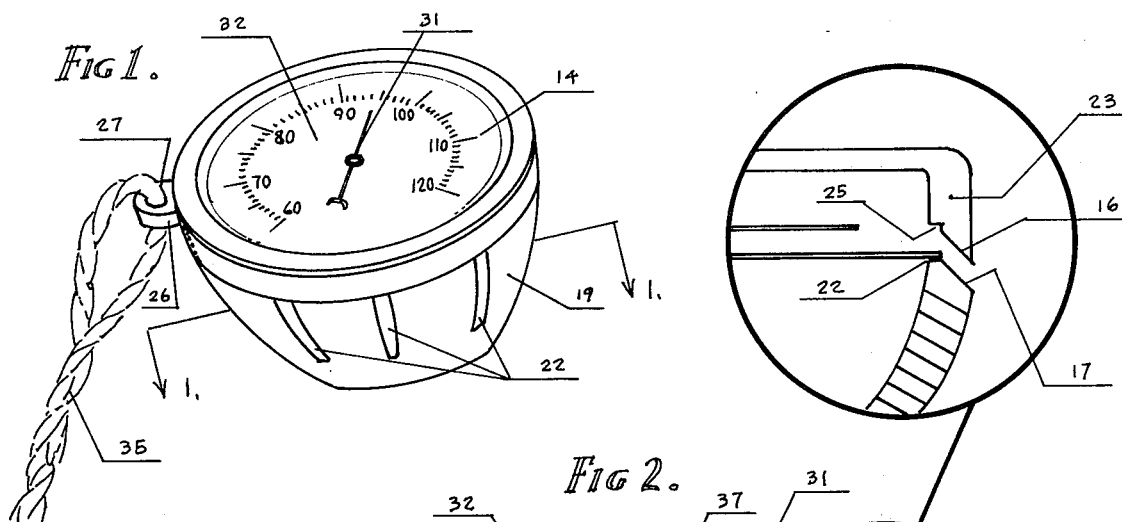
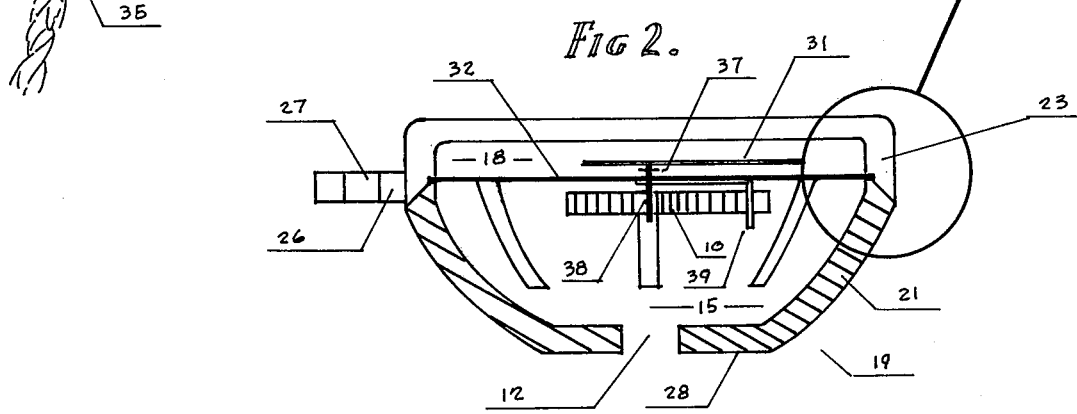
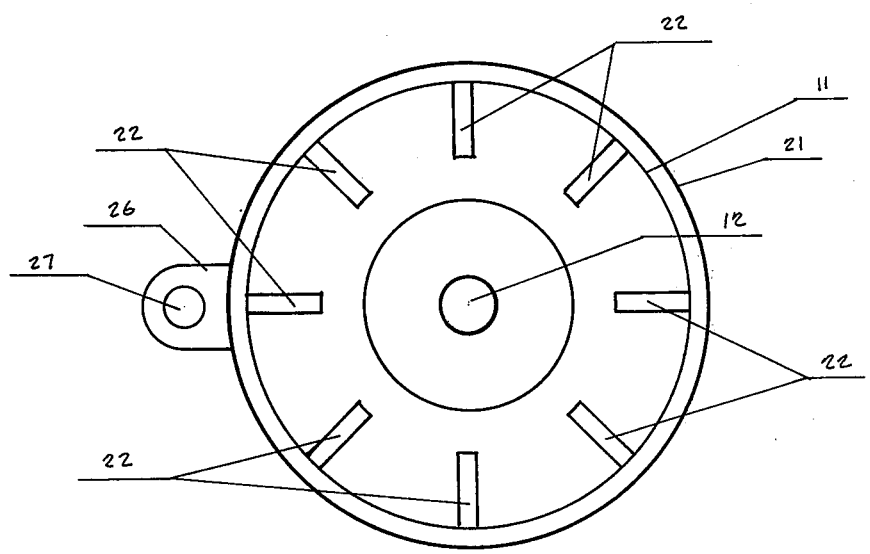

FLOATING BATH WATER TEMPERATURE MEASURING INSTRUMENT

The present invention floats directly in the bath water. Its spherical design permits circulation of the bath water directly against the bimetal coil which, acting mechanically upon a display pointer reflects the temperature of the bath in which it is submerged.

Water for human bathing is generally a mixture of hot water (water hot enough to cause injury to human skin in the event of direct contact) and cold water (water temperature lower than normal human comfort range). The hot and cold water are generally regulated as to flow through the use of valves whose outlets feed the pipes leading directly into the bath enclosure. Regulating the mixtures of hot and cold water for bathing requires the insertion, for purposes of temperature measurement, of a porion of the human body into the unregulated and easily injurious stream of water, and then operating the valves in order to produce a flow of water which feels comfortable as it contacts that particular portion of the human body thrust into it.

Additionally, since it is a known physiological fact that prolonged skin contact to high or low temperatures effects the portions of the skin's ability to accurately determine comfortable temperature for skin not previously immersed, water temperature adjusted in this manner may result in considerable discomfort when in contact with other portions of the body.

Furthermore, regulation of the stream of water entering the bath enclosure does not necessarily result in a bath of the desired temperature in that considerable heat loss occurs through the walls of the bath enclosure and at the interface of the air and water. Therefore, accurate selection of water temperature for comfortable bathing requires continuous monitoring of the actual temperature within the bath.

Another method of temperature regulation, other than through the immersion of a portion of the human body, is to place into the bath a hand held temperature measuring device. Currently available liquid tube and bimetal thermometers react slowly because of their cases and thus have to be held in the bath water for an extended period. Electronic temperature measuring devices are available which would register temperature very rapidly but they are subject to damage as the result of the human bath environment.

Accordingly, it is the object of this invention to provide a bath water temperature measuring instrument which displays the temperature with sufficient accuracy and reproduceability to assure the use of the desired water temperature.

Another object is to provide a temperature measuring instrument which promptly reflects changes in the bath water temperature.

Another object is to provide a bath water temperature measuring instrument which is designed to float on the surface of the bath water and be easily viewed from above.

Another object of this invention is to provide a temperature measuring instrument which may be used in a bath with safety. It must have neither sharp protruding portions nor must it be of a size which could be injested by infants or other nonresponsible individuals.

Another object is to provide a bath water temperature measuring instrument which may be sanitized repeatedly without damage resulting from the hot temperatures and chemicals utilized in the sanitizing process.

Another object is to provide a bath water temperature measuring instrument which is sufficiently strong to withstand all reasonable abuse delivered to a hand-held device which may be utilized in children's bath and thus be treated as a toy rather than an instrument.

Another object is to provide a bath water temperature measuring instrument which is produced of materials which are chemically inert and do not effect the bath water purity.

Another object is to provide a bath water temperature measuring instrument which has an exterior appearance which is aesthetically pleasing and acceptable for use within bathrooms.

Another object is to provide a bath water temperature measuring instrument which is manufactured of materials and components which have an extended useful life and are not subject to rapid deterioration in the liquid environment of the bath.

A further object is to provide a bath water temperature measuring instrument which is practically and economically feasible to manufacture.

Other objects of the invention will in part be obvious and will in part appear hereinafter.

In accordance with these objects, the invention comprises a bath water temperature display device having a bimetal coil, pointer, dial and other mechanical components contained within the cavity of a molded housing pierced around its perimeter by openings to permit the inflow and outflow of bath water. The device is so structured as to provide an air cavity which assures that the device will float in an upright position with the dial above the surface of the liquid at all times. Visibility of the pointer and dial is obtained as the result of separately molding the upper portion of the housing of a very clear plastic.

The invention accordingly comprises that features of construction, combination of elements and arrangement of parts which will be exemplified in the construction hereinafter set forth, and the scope of the invention will be indicated in the claims. For a fuller understanding of the nature and objects of the invention reference should be had to the following detailed description taken in connection with the accompanying drawings:

FIG. 1 is a perspective view of the invention.

FIG. 2 is a cross sectional view taken along lines 1—1.

FIG. 3 is a plan view of the invention viewed from below.

Similar reference characters refer to similar parts throughout the several views of the drawings.

DISCUSSION OF THE PREFERRED EMBODIMENT

Referring now to the drawings in detail. There is illustrated in FIGS. 1 through 3 a temperature measuring instrument 19 comprising the invention.

The invention is preferably utilized in combination with bath, however, it is to be understood it could be utilized for displaying the temperature of any noncaustic fluids when contained within open containers. The invention is comprised of a molded hemisphere 21 pierced around its exterior 11 by openings 22 into the hollow interior 15 of the cavity. These openings permit the entrance of water into the cavity 15 allowing the water to come in intimate contact with the bimetal coil 10. The bimetal coil 10 is held in a fixed position at the end extending from the outer most coil, by clip 29. The other end of the bimetal coil 10 at the center of the coaxial coil is affixed to shaft 38 which passes through the attaching hollow bearing 37, through the dial 32, into cavity 18. Attached to the end of the shaft 38, is a pointer 31, which is rotated across dial face 32, by the rotation of the shaft 38, reflecting the coiling and uncoiling of the bimetal coil 10. Precise temperature is displayed in degrees by gradiations 14 printed on the dial face 32. The assembly of dial 32, pointer 31, shaft 38, bearing 37, clip 39 and bimetal coil 10, are held in position within cavity 15 by shelf 22 on its upper side and by the extension 25 of the molded lens 23. A watertight seal is created between the interface of lens 23 and dial 32 as the result of compression of dial 32 and as the result of the glue applied between the surfaces 16 and 17.

In operation, when placed in water, the cavity 15 fills almost instantaneously with water which enters threaded openings 22 and hole 12. The invention floats on the surface of the water as a result of the air trapped between dial 32 and lens 23 within cavity 18.

The protrusion 26 with hole 27 are provided to place a cord 35 from which the invention 19 can be suspended either from valve handles or other convenient attachments within the bath tub.

The dimensions of the invention are sufficiently large as to prohibit the ingestion of the product by any normal human being. Additionally the housing is entirely made of nontoxic plastic and has no protrusions other than clip 26. The shape of the invention with surface 28 flat, allows it to always sit vertically when placed on a hard surface, and as previously described, its interior design. provides flotation when submerged in water.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall there between.

What is claimed is:

1. A floating apparatus for measuring the temperature of water contained within an open vessel while floating on the surface of the water comprising: casing means with a hemispheric shape, said casing means having a first cavity formed therein, said casing means having at least one passage means through the wall thereof whereby said first cavity means is open to the flow of water, coil means including a first end and a second end disposed within said first cavity and attached at the first end to the wall of said first cavity, shaft means attached to the second end of said coil means, dial plate means disposed in water sealing engagement with the lip of said casing means, lens means disposed in water sealing attachment to the lip of said casing means, a second cavity means formed between said dial means and said lens means whereby said second cavity means is sealed from the flow of water, hollow bearing means connecting said first cavity with said second cavity and configured to receive said shaft means, said shaft means disposed in protruding relation to said hollow bearing means, pointer means disposed in substantially spaced apart parallel relation to said dial plate means and attached to said shaft means, the upper portions of said passage means positioned near the lip of said casing means whereby said passage means at least in part is disposed at the top of said first cavity when said floating apparatus is merged in water, whereby said shaft caused by coiling and uncoiling of said coil means rotates said pointer.

2. Apparatus as in claim 1 wherein said coil means comprises a bimetal coil.

3. Apparatus as in claim 1 wherein said dial plate means further comprises numerical degrees printed thereon.

4. A floating apparatus as in claim 1 wherein said casing means comprises a plurality of passage means.

5. A floating apparatus as in claim 1 wherein said casing means includes a flat portion disposed on the bottom of said casing means relative to the lip thereof.

* * * * *